3,404,133
PRODUCTION OF COPOLYMERS OF α,β-UNSATURATED ALDEHYDES IN A TWO-STEP POLYMERIZATION USING TWO DIFFERENT CATALYSTS
Werner Kern and Rolf Schulz, Mainz (Rhine), and Karl Wolfram Passmann, Frankfurt am Main-Sindlingen, Germany, assignors to Deutsche Gold- und Silber-Scheideanstalt vormals Roessler, Frankfurt am Main, Germany
No Drawing. Filed July 1, 1964, Ser. No. 379,729
Claims priority, application Germany, July 2, 1963, D 41,873
8 Claims. (Cl. 260—64)

ABSTRACT OF THE DISCLOSURE

Production of copolymers essentially consisting in polymerizing in a first step an α,β-unsaturated aldehyde dissolved in a liquid $>C=CH_2$ group containing monomer in the presence of an ionic polymerization catalyst for the aldehyde, destroying such catalyst and then in a second step copolymerizing the aldehyde polymer with the liquid monomer with the aid of a radical forming catalyst.

---

The present invention relates to an improved process for the production of copolymers of α,β-unsaturated aldehydes with other comonomers containing a terminal $>C=CH_2$ group.

It is known that α,β-unsaturated aldehydes and particularly acrolein can be copolymerized with vinyl compounds in aqueous mediums or organic solvents. In this type of copolymerization all monomers present can simultaneously take part in the growth reactions. The properties of these usually statistically built up copolymers depend to a great extent on their composition. With high acrolein contents the copolymers are produced in the form of loose powders which are insoluble in most usual organic solvents. They furthermore are infusible and form opaque or completely untransparent pressure molded products. Furthermore, they discolor at higher temperatures. The acrolein copolymers produced by previously known processes cannot be cast.

It is an object of the present invention to produce colorless, clear copolymers of α,β-unsaturated aldehydes with other terminal $>C=CH_2$ group containing comonomers which if desired can be obtained as shaped structures.

According to the invention it was unexpectedly found that colorless, clear transparent copolymers can be produced from one or more α,β-unsaturated aldehydes and one or more $>C=CH_2$ group containing comonomers if a solution of one or more α,β-unsaturated aldehydes in one or more liquid $>C=CH_2$ group containing comonomers is subjected to a two step polymerization using two different polymerization catalysts, in the first step of which the unsaturated aldehyde component is polymerized substantially quantitatively with the first catalyst whereafter, after destruction of such first catalyst, the $>C=CH_2$ group containing comonomeric component is copolymerized with the polymeric unsaturated aldehyde with the aid of a different catalyst.

The simultaneous presence of the unsaturated aldehyde component and of the $>C=CH_2$ group containing component and the sequential use of two different catalysts, one of which only is an active polymerization catalyst in the first step and the other of which is only active in the second step, are critical for the success of the two step polymerization according to the invention. Therefore, each catalyst is selective in the polymerization of one type of monomer, namely, either the aldehyde or the $>C=CH_2$ group containing comonomer.

Both catalysts can be two different ionic catalysts, however, preferably pairs of ionic and radical forming catalysts are employed, that is, an ionic catalyst for the first step for the aldehyde polymerization and a radical forming catalyst for the second step for the copolymerization of the unsaturated acrolein polymer formed in the first step with the $>C=CH_2$ group containing monomer.

Sodium alcoholates, such as, sodium methylate and sodium ethylate, pyridine, piperidine, naphthalene sodium, triphenyl methane sodium, metallic sodium, benzophenone potassium, sodium amide, butyl lithium, phosphines, boron fluoride, boron fluoride etherate and aluminum chloride, for example, come into question as ionic catalysts.

Peroxides, aliphatic azo compounds and redox catalyst systems of peroxidic compounds and salts of the transition metals in lower valent form, organic sulfur compounds, such as α-amino sulfones, sulfinic acid derivatives, compounds with labile halogen atoms, such as trichloro acetonitrile, epichlorhydrin and chlorinated ethylenes, for example, come into consideration as radical forming catalysts. The redox system of cyclohexanone peroxide and cobalt naphthenate is mentioned.

The catalysts are employed in the usual quantities of 0.01 to 5% by weight with reference to the monomers to be polymerized. Their concentrations in both steps can be the same or different. The concentration of the catalyst used in the second step can be somewhat higher, for example, 0.1 to 10% by weight of the monomer mixture. In this connection, the term monomer mixture is used with reference to the first step as meaning the mixture of the α,β-unsaturated aldehyde component and the $>C=CH_2$ group containing component whereas with reference to the second step as meaning the $>C=CH_2$ group containing component whether a single monomer or several monomers in admixture. The selection of the catalysts and their possible combinations in both polymerization steps depends upon the type of $>C=CH_2$ component concerned.

The macromolecules derived from the α,β-unsaturated aldehydes present after the first polymerization step in addition to basic structural units with aldehyde groups also contain basic structural units containing unsaturated groups derived from the α,β-unsaturation of the aldehydes. It is on these unsaturated groups that a cross-linking copolymerization takes place in the second step. It has been found that the degree of polymerization depends upon the type of catalyst used in the aldehyde polymerization in the first step. For example, when pyridine or piperidine is used as the catalyst 10 to 30% of the structural units contain unsaturated groups, when sodium methylate is used this increases to 30 to 50% and when naphthalene sodium is used this increases still further up to about 70%.

Acrolein and croton aldehyde are typical examples of the α,β-unsaturated aldehydes concerned.

Vinyl hydrocarbons, both aliphatic, such as isobutylene, and aromatic, such as styrene, vinyl esters, vinyl ketones, such as methyl vinyl ketone, vinyl ethers, acrylic and methacrylic acid acid derivatives such as the esters, and dienes, such as butadiene and isoprene, also come into consideration as the $>C=CH_2$ group containing component.

One of the prerequisites of the process according to the invention is that the $>C=CH_2$ containing components are insensitive to the catalyst used in the first step and that they do not polymerize spontaneously or hinder the polymerization of the aldehyde. In the first step they only serve as solvents for the aldehyde monomer and the unsaturated aldehyde polymer produced therefrom.

The choice of the selective catalyst for the first step of the process according to the invention causes an unsaturated aldehyde polymer to be formed in such first step. The second catalyst is introduced into the solution after elimination of the first catalyst, for example, by neutralization. Such second catalyst initiates the copolymerization between the >C=CH₂ group containing component and the unsaturated aldehyde polymer which causes the reaction mixture to harden with cross-linking.

The chemical nature of the first catalyst determines the manner in which it can be eliminated. Basic catalysts expediently are neutralized by addition of an equivalent quantity of a weak acid such as benzoic acid or stearic acid. Cationic catalysts can be inactivated by the addition of weak bases such as tertiary amines or by aliphatic alcohols with 1–7 C-atoms. The substances employed for the inactivation of the first catalyst must be such as not to disturb the second polymerization step.

The proportions of the unsaturated aldehyde component and the >C=CH₂ group containing compound employed can be varied within wide ranges. The ratios of such components, for example, may be varied between 10:90 and 90:10 parts by weight. The proportion used, however, to some extent depends upon the monomeric components concerned as they are limited to those providing mutual miscibility not only for the monomers but also for the polymeric phases. Within such limits the properties of the end products can be varied by varying the proportions of the starting monomer components.

The polymerization can be carried out using the same temperature or a different temperature for each step. In general the temperature range is between —100 to +200° C. Temperatures of —50 to +20° C. are especially suited for the first step. When the second step is catalysed by radical donors or redox systems, temperatures between 0 and +80° C. are especially suitable. The optimum temperature depends upon the concentration of the double bonds and of the initiator. In most instances a controlled programmed temperature course is employed. When especially volatile monomers are concerned the curing must be effected in closed molds.

The copolymers produced as end products are colorless and clear. They can be shaped by cutting operations and also be polished. They are in the specified proportions of the monomers, infusible and insoluble in all known inorganic and organic solvents between room temperature and 200° C., for example, alcohols, ethers, hydrocarbons, ketones.

The clear viscous syrup which is obtained after the first polymerization step and which essentially consists of a solution of the unsaturated aldehyde component polymer in the comonomer can be stabilized, if necessary, by the addition of an inhibitor such as hydroquinone, other hydroxy benzenes, as well as other radical chain inhibitors, to provie a storable and shippable product which can be subjected to the second polymerization step after any desired lapse of time. The copolymerization which is initiated by the addition of the second catalyst can be carried out in molds. The two step process according to the invention renders its possible to produce shaped structures of copolymers of unsaturated aldehydes which, as already indicated, previously had not been possible.

It is possible to produce colored or reenforced copolymers by the addition of pigments, dyes or fillers before the second polymerization step. It is also possible to mix polyester resins or, for example, methyl methacrylate resins with the syrup of the first polymerization step.

Furthermore, the process according to the invention can be employed to produce terploymers from α,β-unsaturated aldehydes and two different ethylenically unsaturated comonomers either by mixing both unsaturated comonomers with the unsaturated aldehyde right from the start or by carrying out the polymerization of the unsaturated aldehyde in the first step in the presence of only one of such comonomers and only adding the second comonomer after the first catalyst has been destroyed. The latter procedure is preferred when a comonomer combination is desired in which one of the components is not sufficiently stable against the catalyst used for the first polymerization step. The advantage of this mode of procedure is the great possibility for variation provided thereby.

The following examples will serve to illustrate the invention with reference to several embodiments thereof.

Example 1

0.55 cc. of a 5.3 N-methanolic sodium methylate solution were introduced into a 250 cc. four necked flask provided with a stirrer, two dropping funnels and a vacuum closure. The flask was evacuated to distill off the methanol to leave the solid sodium methylate. Thereupon 80 cc. of styrene were introduced and cooled down to —29° C. After the addition of 50 cc. of acrolein stabilized with 0.05% of hydroquinone, the sodium medium dissolved slowly. A clear viscous solution resulted after 70 minutes at a temperature of —32 to —35° C.

The methylate was decomposed by the addition of 350 mg. of benzoic acid. The reaction mixture was warmed to room temperature and 1 g. of azoisobutyric acid nitrile added thereto and then cast into molds. Glass clear hard molded products were obtained after 30 hours at 48° C.

Example 2

0.025 cc. of piperidine were added to a mixture of 10 cc. of styrene and 5 cc. of acrolein at —10° C. A clear viscous solution was obtained after 10 hours. The ionic polymerization was finished and the ionic catalyst was destroyed by the addition of 50 mg. of benzoic acid. The cross-linking copolymerization was then initiated by the addition of 100 mg. of benzoyl peroxide and heating to 48° C. until the mixture hardened.

Example 3

5 cc. of acrolein were added to a suspension of 10 mg. of finely divided sodium in 10 cc. of styrene which had been cooled to —30° C. After 50 minutes 50 mg. of benzoic acid were added to the clear viscous solution followed by the addition of 100 mg. of azoisobutyric acid nitrile. Curing was effected at about 48° C.

Example 4

0.375 cc. of 5 N-methanolic sodium methylate were introduced into a flask and the methanol distilled off as in Example 1. 40 cc. of methyl methacrylate followed by 20 cc. of acrolein were added at —45 to —50° C. After 115 minutes 170 mg. of benzoic acid were added to the clear highly viscous solution. Then 0.5 g. of azoisobutyric acid nitrile were added and the mass cured at 48° C.

Example 5

38.3 mg. of pure sodium methylate are added to a mixture of 7.5 cc. of isoprene and 5 cc. of acrolein at 30° C. After 50 minutes there is formed a clear, viscous solution. After the acrolein having polymerized quantitatively, the anionic catalyst is destroyed by adding 100 mg. of benzoic acid or by adding 0.1 cc. of isobutyric acid. The cross-linking is carried out by adding 100 mg. of azoisobutyric acid nitrile at 30° C. A transparent, slightly yellow coloured product like rubber resulted.

Example 6

38.3 mg. of pure sodium methylate are added to a mixture of 7 cc. chloroprene and 5 cc. of acrolein at —30° C. The anionic polymerization is finished after 30 minutes while stirring with a magnetic stirrer and the anionic catalyst is neutralized by 100 mg. of benzoic acid. The clear, highly viscous solution is cured by 100 mg. of azoisobutyric acid nitrile at 48° C. A clear product like rubber resulted.

Example 7

38.3 mg. of sodium methylate are added to a mixture of 8.2 cc. of vinyl pyridine and 5 cc. of acrolein at −50° C. while stirring with a magnetic stirrer. After 10 minutes the solution becomes highly viscous. Then 100 mg. of benzoic acid is added. Subsequently the reaction mixture is cured at +48 C. with 100 mg. of azoisobutyric acid nitrile.

Example 8

0.2 cc. of boron trifluoride etherate are added to a mixture of 0.8 cc. of methyl methacrylate and 5 cc. of acrolein at 0° C. After 20 hours there is added a mixture of 0.3 cc. of methanol and 100 mg. of azoisobutyric acid nitrile, and the reaction mixture is cured at 48° C. A solid, transparent product resulted.

Example 9

38.3 mg. of sodium methylate are added to a mixture of 8.2 cc. of styrene and 5 cc. of acrolein. After 30 minutes the anionic polymerization is finished and the catalyst is destroyed at −32 to −35° C. corresponding to the preceded examples. The clear, viscous solution is cured with 70 mg. of benzoyl peroxide and 110 mg. of benzoin first 1 hour at 50° C., then 24 hours at room temperature.

Example 10

38.3 mg. of sodium methylate are added to 8.2 cc. of styrene and 5 cc. of acrolein at −30° C. The anionic polymerization is finished after 30 minutes at −32 to −35° C. and the anionic catalyst is destroyed by adding of 100 mg. of benzoic acid. 0.2 cc. of boron trifluoride etherate is mixed with the clear viscous solution. The mass is cured at 0° C.

We claim:

1. In a process for the production of copolymers of at least an $\alpha,\beta$-unsaturated aldehyde selected from the group consisting of acrolein and crotonaldehyde and at least one liquid $>C=CH_2$ group containing comonomer copolymerizable with said $\alpha,\beta$-unsaturated aldehyde, the improvement which consists essentially in a first step polymerizing at least one $\alpha,\beta$-unsaturated aldehyde dissolved in at least one liquid $>C=CH_2$ group containing comonomer copolymerizable with said $\alpha,\beta$-unsaturated aldehyde in the presence of an ionic catalyst selective for the polymerization of said unsaturated aldehyde selected from the group consisting of sodium alcoholate, sodium amide, metallic sodium, naphthalene sodium, triphenyl methyl sodium, benzophenone potassium, butyl lithium, pyridine, piperidine, phosphines, aluminum chloride and boron fluoride, said comonomer being inert with respect to said ionic catalyst, thereafter destroying such catalyst and, in a second step, copolymerizing the resulting unsaturated aldehyde polymer with the $>C=CH_2$ group containing comonomer in the presence of a radical forming catalyst selected from the group consisting of peroxidic compounds, aliphatic azo compounds and redox systems composed of peroxidic compounds and salts of transition metals in their lower valent state.

2. In a process for the production of copolymers of at least an $\alpha,\beta$-unsaturated aldehyde selected from the group consisting of acrolein and crotonaldehyde and at least one liquid $>C=CH_2$ group containing comonomer copolymerizable with said $\alpha,\beta$-unsaturated aldehyde, the improvement which consists essentially in a first step polymerizing at least one $\alpha,\beta$-unsaturated aldehyde dissolved in at least one liquid $>C=CH_2$ group containing comonomer copolymerizable with said $\alpha,\beta$-unsaturated aldehyde selected from the group consisting of styrene, methylmethacrylate, methyl vinyl ketone, isoprene, butadiene, chloroprene and vinyl pyridine in the presence of an ionic catalyst selective for the polymerization of said unsaturated aldehyde selected from the group consisting of sodium alcoholate, sodium amide, metallic sodium, naphthalene sodium, triphenyl methyl sodium, benzophenone potassium, butyl lithium, pyridine, piperidine, phosphines, aluminum chloride and boron fluoride, said comonomer being inert with respect to said ionic catalyst, thereafter destroying such catalyst and, in a second step, copolymerizing the resulting unsaturated aldehyde polymer with the $>C=CH_2$ group containing comonomer in the presence of a radical forming catalyst selected from the group consisting of peroxidic compounds, aliphatic azo compounds and redox systems composed of peroxidic compounds and salts of transition metals in their lower valent state.

3. The process of claim 2 in which acrolein is the unsaturated aldehyde.

4. The process of claim 3 in which the comonomer is styrene.

5. The process of claim 3 in which the comonomer is methyl methacrylate.

6. The process of claim 2 in which the proportions of the aldehyde component and the comonomer component is between 1:9 and 9:1 by weight.

7. The process of claim 2 in which the polymerization in the first and second steps is carried out between −100 and +200° C.

8. The process of claim 2 in which the catalyst concentration used in the first step is 0.01 to 5% by weight with reference to the monomeric mixture and in the second step is 0.01 to 10% by weight of the comonomer component.

References Cited

UNITED STATES PATENTS

| | | | |
|---|---|---|---|
| 3,175,996 | 3/1965 | Gregorian et al. | 260—63 |
| 3,180,906 | 4/1965 | Zimmermann et al. | 260—860 |
| 3,183,217 | 5/1965 | Serniuk et al. | 260—85.5 |
| 3,258,451 | 6/1966 | Rink et al. | 260—67 |
| 3,284,412 | 11/1966 | Furukawa et al. | 260—67 |

WILLIAM H. SHORT, *Primary Examiner.*

L. M. PHYNES, *Assistant Examiner.*